United States Patent Office 3,559,141
Patented Jan. 26, 1971

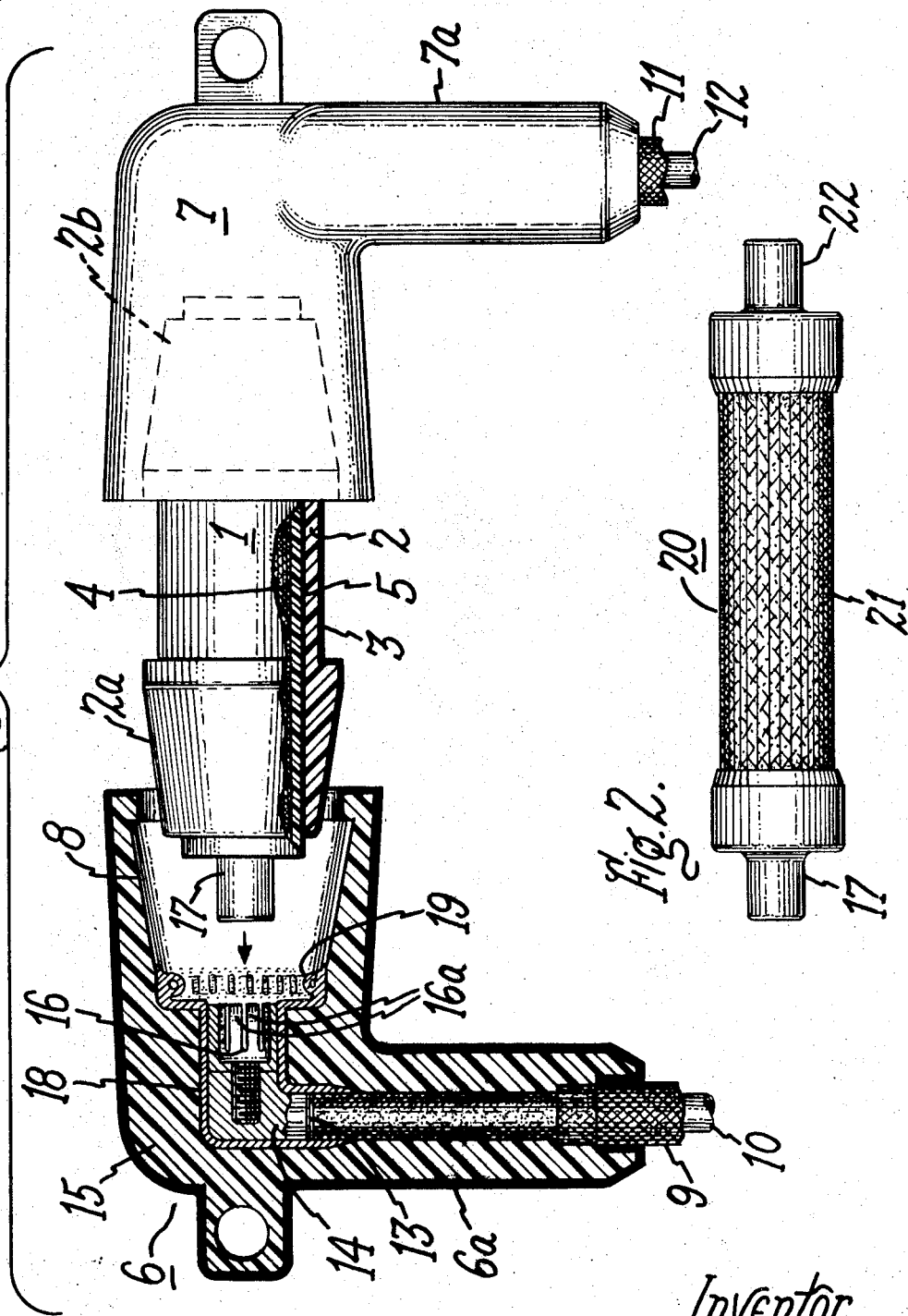

3,559,141
UNDERGROUND ELECTRIC POWER CABLE FUSE HOUSING HAVING A SEMI-CONDUCTIVE CORONA SHIELD
Samuel G. Hardy, Durham, N.H., assignor to General Electric Company, a corporation of New York
Filed Oct. 23, 1969, Ser. No. 868,814
Int. Cl. H01h 85/58
U.S. Cl. 337—224           10 Claims

ABSTRACT OF THE DISCLOSURE

A fuse housing for an underground electric distribution system is formed with a water-tight fuse enclosing chamber, the inner walls of which are coated with a layer of semi-conductive material which is electrically coupled to both terminals of a fuse mounted therein. Thus, the voltage differential between the outer surface of the fuse cartridge and the inner surface of the fuse housing is reduced to a low level such that corona is not developed between these two surfaces. In order to limit the amount of leakage current flowing through the semi-conductive coating on the fuse housing's inner surface, the terminal-to-terminal resistance of this coating is in excess of 10 megohms.

---

The present invention relates to underground electric power distribution systems of the type wherein connections and junctions of the system are made by utilizing quickly and easily detachable voltage grading termination modules to form such junctions or couplings. More particularly, the invention relates to a modular housing for releasably mounting a fuse in such a system in water-tight, voltage grading relation with respect to the exterior surface of the system components.

As is the case with more conventional power distribution systems that are mostly above ground level, it is desirable to provide underground power distribution system components with fuse protection to prevent damage to such components when overcurrent surges occur on the system. However, it has been found that underground power distribution systems produce severe corona problems associated with attempts to utilize fuses in them. The basic causes of this problem stems from the fact that voltage gradients across the respective insulating surfaces of these underground systems is substantially greater in many instances than similar gradients encountered in open air systems. The steeper gradients are occasioned by the fact that underground power distribution systems are conventionally provided with an electrically conductive ground shield on their outer surface which, of course, is in turn directly in contact with the earth in which extensive portions of the system are directly buried. Thus, the high system voltages present on the insulating power conductors and operating components of the system, such as the power fuses therein, are separated by a relatively short length, or thickness, of insulating material between them and the ground potential present on the system's ground shield. Accordingly, extreme care must be taken in designing and assembling underground power distribution systems to either prevent the presence of voids in the system's insulation, which could be electrically stressed and caused to arc over, or means must be provided to eliminate such electrical stressing in voids that do occur.

An example of the latter type of solution to the foregoing problem is described in detail in U.S. Pat. 3,344,391, which teaches the use of a sleeve of elatsomer material positioned over the irregular surfaces of conducting metal components in underground cable termination modules to eliminate the electrical stressing of air trapped in these crevices or irregularities of the components. The conductive inner sleeves used in such patented applications are generally molded directly to the insulating body of the termination modules so that the junction between these sleeves and the insulating body is void free.

The use of series-connected fuse in such an underground distribution system presents a particular problem that cannot be solved by use of the foregoing technique of placing a conductive sleeve around the irregularities of the fuse surface to prevent the air-filled spaced formed by these irregularities from being electrically stressed and arced over by the voltage gradient present between the poential on the fuse terminals and the system's ground plane. It should be apparent that if such a sleeve arrangement were utilized to encase a series-connected fuse, when the fuse element ruptured to interrupt the primary power circuit line voltage would be placed directly across the conductive sleeve and the resultant current through this sleeve would rapidly heat it and completely destroy the fuse housing module.

As mentioned above, there is a real need for incorporating series-connected fuses in underground power distribution systems; accordingly, numerous attempts have been made to develop a suitable corona-free fuse housing for an underground distribution system, which is relatively inexpensive to manufacture and at the same time conveniently compact to allow its use in the relatively confined vaults and passageways available for mounting such housings in underground distribution systems. Heretofore, such attempts have taken two basic approaches; namely, the use of a thicker layer or layers of resistance material between the fuse and the outer ground-plane surface of the fuse housing module and, secondly, the use of various expedients to avoid the formation of air pockets between the high potential fuse terminals and the ground shield of the fuse housing. The former approach is objectionable because it results in an unduly bulky fuse housing component and at the same time is excessively expensive to manufacture. The latter type of approach has the disadvantage of being very expensive and at the same time results in quite erratic results so far as successfully and uniformly preventing the formation of corona discharges is concerned.

The present invention overcomes the foregoing problems by providing an inexpensive and highly reliable fuse housing module that prevents corona from forming across air pockets around a fuse cartridge therein and also limits the corona discharge resulting from a rupture of the fusible link in such a fuse. Briefly stated, in one preferred form of the invention, a shielded housing for a fuse of the type used on underground distribution systems is provided with a tubular passageway that is adapted to house a cartridge-type fuse in water-tight relation with respect to the outer surface of the distribution system components. Pursuant to the invention, a coating of semi-conductive material is deposited in void-free fashion on a hard surfaced insulating sleeve that forms the fuse receiving passageway. When the fuse housing is placed in operating position with a fuse mounted therein, the respective terminals of the fuse are electrically connected to the ends of the semi-conductive coating; thus, raising the voltage of this coating sufficiently to prevent electrical stressing of the air trapped between it and the irregular surface of the fuse cartridge. The semi-conductive coating is characterized by having a resistance sufficiently high to prevent the discharge of excessive leakage current when and if the fusible link of the fuse fails during operation of the distribution system. It has been found that with presently conventional power distribution system voltages, i.e. voltages of 15 kilovolts or less, an acceptable level of leakage current is maintained by keeping the linear resistance of the semi-conductive coating in excess of 10 megohms.

A primary object of the present invention is to provide a fuse housing module for underground power distribution systems which constitutes an improved means of overcoming the above-mentioned problems.

Another object of the invention is to provide a fuse housing for an underground distribution system which prevents the formation of corona across voids adjacent a fuse cartridge mounted therein.

A still further object of the invention is to provide a fuse housing for use in an underground distribution system which has a corona shield that limits the amount of radio interference developed by a fuse failure within the housing.

Yet another object of the invention is to provide a fuse housing, of a type adapted for use in an underground distribution system, with a semi-conductive coating that prevents electrical stressing of air gaps adjacent a fuse mounted therein and at the same time limits the amount of leakage current that flows around the fuse cartridge after its fusible element has been ruptured.

Other objects and advantages of my invention will become apparent from the following description taken in connection with the drawings in which:

FIG. 1 is a side elevation view, partly in cross-section, of a fuse housing for an underground distribution system which embodies the corona preventing and leakage current limiting structural features of my invention.

FIG. 2 is a side elevation view of a cartridge fuse of a type that can be conveniently utilized with the embodiment of my invention depicted in FIG. 1.

Referring now to FIG. 1 of the drawing, there is shown a molded elastomeric tubular housing 1 for a cartridge type fuse of a kind suitable for series connection in an underground electric power distribution system to protect components of that system from damage due to overcurrent surges. The housing 1 is formed of any suitable high dielectric strength elastomeric insulating material molded or cast in the form of a cylinder 2 having conically tapered end portions 2A and 2B at the opposite extremities thereof. Any suitable insulating material may be used to form the cylinder 2 and portions 2A and 2B of the housing 1, but I have found that an ideal material for this purpose is an elastomeric material compounded of an ethylenepropylene terpolymer and other constituents and additives as commonly employed in the manufacture of rubber, which is readily available commercially under the trademark Nordel, of E. I. du Pont de Nemours & Company. The outer surface of tubular housing 1 between the tapered ends 2A and 2B thereof is covered with a coating 3 of conductive material that is mounted on the outer surface of the housing 1 to form a ground potential surface, or ground plane or shield for the housing. This conductive coating 3 may also be formed of elastomeric Nordel, which, of course, differs from the insulating type of Nordel used to form the cylinder portion 2 of the housing 1 by having sufficient carbon or other conductive material loaded in its composition to make it a low-resistance conductor.

Pursuant to the present invention, a high impact resistance tube 4 having a relatively hard, abrasion resistance surface is concentrically positioned within the elastomeric insulating cylinder 2 and a layer of semi-conductive material 5 is deposited over substantially the entire outer surface of the tube 4. In the preferred embodiment of the invention, the layer of semi-conductive material 5 is formed of boron carbide that is sprayed on the outer surface of tube 4 in three successive layers, followed by an air curing step between successive layers. Then, the multiple layers of boron carbide are baked at 100° C. on the tube 4 to firmly attach them thereto and harden the conductive surface of the layer 5. It will be appreciated that other suitable semi-conductive materials can be used to form the layer 5 and I have found that silicon carbide, for example, is also ideally suited for this purpose. It is only necessary to remember that the linear resistance of the layer of semi-conductive material 5 when measured between the respective ends of this layer on tube 4 must not be lower than approximately 10 megohms on systems utilizing 15 kilovolt power, and may range up to in excess of 100 megohms for higher system voltages, in order to carry out the purposes of the invention. I have found that an ideal material for forming the high impact tube 4 is filament-wound glass epoxy; however, other suitable materials such as various phenolic resins may be used if desired.

In practice, I have discovered that it is desirable to form the composite tubular housing 1 by first spraying the semi-conductive layer of silicon carbide on the glass epoxy tube 4 then curing it as noted above before molding the tube of elastomeric insulating material 2 directly around the layer of semi-conductive material 5. In this manner, in the preferred embodiment of my invention, the layer of semi-conductive material is hermetically sealed between the glass epoxy tube 4 and the tubular insulating housing 2 so that it cannot be contaminated or otherwise damaged when a fuse interruption occurs within the housing releasing substantial volumes of high temperature gas.

The shielded housing of the preferred embodiment of my invention is completed by a pair of cup-shaped fuse terminal housings 6 and 7 which are adapted to fit over the respective end portions 2A and 2B of tubular housing 1 to form water-tight seals therewith. Toward this end, cup-shaped housing 6 has a conically sloped inner surface 8 that complements the slope of surface 2A on housing 1 so that when these two surfaces are moved together in operating position, with a fuse within housing 1, a water-tight seal is formed therebetween. In like manner, cup-shaped fuse terminal housing 7 is provided with a similar slope surface (not shown) which is complementary to the sloped surface 2B on fuse housing 1.

The cup-shaped housings 6 and 7, respectively, are coated with a conductive material 6A and 7A over their entire outer surfaces and around the inner lips at their respective opposite ends. As can be seen in detail by referring to the cross-section view of cup-shaped member 6, the conductive layer 6A is in electrical contact with a portion of a conductive outer shield 9 on the end of power cable 10 and it will be understood that the conductive coating 7A on cup-shaped member 7 is also in conductive contact with the ground plane shield 11 on a second cable 12 of a power distribution system in which the fuse housing 1 is adapted to be connected. Thus, a uniform, continuous ground plane is formed from the outer surface of the respective cable shields 9 and 11 over the respective outer surfaces of the cup-shaped fuse terminal housings 6 and 7 and, when the tubular housing 1 is in operating position with both pairs of complementary conical surfaces 2A–8 and 2B, the end of conductive coating 6A will be in contact with the conductive coating 3 on housing 1, which is also in electrical contact with the end of coating 7A on fuse terminal housing 7 so that the ground plane is uniform over the entire outer surface of the fuse housing arrangement.

It should be understood that the internal components of cup-shaped housings 6 and 7 are substantially identical, therefore, to describe the operation of my invention, only the structure within the cup-shaped housing 6 will be discused. The end of cable 10 is provided with a crimp connector contact 13 that is inserted in conducting relation within an embedded L-shaped conductor 14 that is permanently molded in the insulating Nordel body 15 of cup-shaped housing 6. The L-shaped conductor 14 also has a fuse terminal 16 screwed into a tapered aperture thereof, as shown in FIG. 1. The fuse terminal 16 is provided with a plurality of flexible fingers 16A, which are adapted to receive a fuse terminal, such as the terminal 17 shown protruding from the end of tubular housing 1. In order to prevent voids from being formed around the irregular surfaces of L-shaped contact 14, the contact 13 and terminal 16, a sleeve of elastomeric conductive material 18 is molded to the insulating material 15 of cup-shaped housing 6 around the area in which these elements are disposed. Pursuant to the present invention, the exposed end of conductive sleeve 18 has molded into it an annular metal spring 19 which is adapted to dilate and receive one end of the high impact tube 4 of tubular housing 1 within its diameter. Thus, the annular spring 19 forms a resilient electrical contact with the layer of semi-conductive material 5 on its end when the fuse housing is in its sealed, water-tight operating position. It will be understood that a similar contact is made between a related annular spring within cup-shaped housing 7 so that when the fuse housing is in operating position, a continuous electrical circuit is formed between fuse termnals at opposite ends of the housing through the layer of semi-conductive material 5.

It can now be appreciated that the invention, as described thus far, may be assembled to form a water-tight fuse housing that is adapted to receive a cartridge type fuse. Referring to FIG. 2 of the drawing, it will be seen that there is shown an enlarged view of such a cartridge type fuse in order to assure a clear understanding of the present invention. This fuse 20 comprises an insulating cylindrical body portion 21 having a pair of fuse terminals 17 and 22 mounted at the opposite ends thereof to seal the cylinder 21. It will be understood that a fusible element extends between terminals 17 and 22 and this element is normally embedded in a body of sand or other suitable arc quenching material sealed within cylinder 21 around the fusible element. As can be seen by referring again to FIG. 1, the irregular outer surface of the cartridge fuse 20 causes a substantial air gap to be formed between that surface and the innermost surface of the high impact, abrasion resistant tube 4 of tubular fuse housing 1 when fuse 20 is positioned concentrically within housing 1. Therefore, if it were not for the shielding effect of my invention, the space created by these irregular surfaces would be exposed to extremely high voltage gradients which would most probably cause corona to form at the surface of the fuse cartridge 20.

However, by the operation of my invention, the layer of semi-conductive material 5 is raised to the voltage present on the respective distribution conductors 10 and 12 due to the electrical connection therewith through the respective annular spring contacts, such as spring 19 in cup-shaped housing 6. This unique circuit causes the voltage across the space around fuse cartridge 20 to be reduced to a very low level which, of course, does not tend to produce any corona. I have also found that the layer of semi-conductive material 5 serves to reduce the amount of ratio noise developed when the fusible element in fuse 20 ruptures during an overcurrent protecting operation thereof. Thus, a double advantage is realized from my invention. When such a fuse rupture occurs, the full line voltage is impressed across the length of the semi-conductive layer 5, therefore, some leakage current will flow through the semi-conductive layer 5. However, pursuant to the teaching of my invention, the linear resistance of semi-conductive layer 5 is maintained in excess of 10 megohms, therefore, the amount of this leakage current is sufficiently small at normal electric power distribution voltages to prevent any damage from being done to the tubular fuse housing 1 following a fuse interruption of the circuit in which conductors 10 and 12 are connected.

It will be apparent to those skilled in the art that various modifications of my invention can be made without departing from its true spirit and scope. For example, if desired, the tubular housing 1 could be formed integrally with one of the cup-shaped housing 6 or 7, so that a fuse cartridge such as cartridge 20 could only be removed from one end of the tubular housing portion 1, and only one conical surface would be separable, therefore, the chance of moisture leakage into the system would be substantially reduced. A further modification along this same line would be to insert a cartridge type fuse into an elbow type termination through the wall of the elbow thereof in a manner similar to that shown in copending U.S. patent application 826,515, filed May 21, 1969 and assigned to the assignee of the present invention. Another modification of the preferred form of my invention could entail coating the inner surface of tube 4 with a layer of semi-conductive material to thus form a parallel circuit with the layer of semi-conductive material 5. Alternatively, strips of spirally wound semi-conductive material might be positioned along one of the surfaces of tube 4 in lieu of the layer or layers of semi-conductive material 5 deposited directly on tube 4 in the preferred embodiments of my invention. In such alternative embodiments, care must be taken to make any portion of the semi-conductive material that can be contacted by fuse 20 of a suitable abrasion resistant material to prevent it from being broken by such mechanical contact. All such modifications and improvements of the invention are intended to be encompassed within the scope of the following claims.

What I claim as new and desire to secure and protect by Letters Patent of the United States is:

1. A shielded housing for a current limiting fuse that is adapted for use in an underground electric power distribution system comprising; an elastomeric tubular housing formed of high dielectric strength insulating material, a semi-conductive layer of material positioned within said tubular housing and extending along a surface generally parallel to the longitudinal axis of said housing, said layer of semi-conductive material and said tubular housing being positioned in relatively void-free relation to each other over their respective lengths thereby to prevent the formation of corona therebetween, a coating of conductive material mounted on the outer surface of said tubular housing to form a ground potential surface for the housing, a pair of cup-shaped fuse terminal housings adapted to fit over the respective ends of said tubular housing to form water-tight seals therewith, a coating of conductive material mounted on the outer surface of each of said terminal housings and positioned to coact with the coating on said tubular housing to form a uniform ground potential surface over the outside of all three housings when they are connected in operating position to form a water-tight fuse chamber, each of said terminal housings having an electrically conductive fuse terminal mounted therein and electrically conductive members respectively connected to electrically couple the ends of the semi-conductive layer to said terminals when the housings are in said operating position, whereby said semi-conductive layer acts as a corona-preventing shield around a fuse mounted in said housing to form a low resistance circuit between said terminals, and said semi-conductive layer forms a current limiting leakage path between said terminals when said low resistance circuit is interrupted.

2. An invention as in claim 1 wherein said semi-conductive layer is deposited on a high impact strength cylinder and comprises a coating of semi-conductive material taken from the class of boron carbide or silicon carbide, said layer being mounted on at least one surface of said cylinder to form a continuous coating between said electrically conductive members when the cup-shaped terminal housings are in said operating position.

3. An invention as in claim 1 wherein said tube of semi-conductive material forms a high resistance circuit between said conductive members having a resistance of at least 10 megohms.

4. An invention as in claim 1 wherein said elastomeric tubular housing is fastened to said layer of semi-conductive material by being molded directly thereon whereby corona-inducing spaces between said tubular housing and said tube are minimized.

5. An invention as in claim 2 wherein both the inner and outer surfaces of said cylinder are coated with said semi-conductive material over substantially their respective entire areas.

6. An invention as in claim 2 wherein said layer of conductive material is mounted on the outer surface of said cylinder and said elastomeric tubular housing is molded to said layer thereby to prevent said layer of material from being contaminated by gas or other impurities when a fuse ruptures within the cylinder, whereby said housing can be used repeatedly to shield successive fused circuit interruptions.

7. An invention as in claim 2 wherein said high impact cylinder is formed of filament-wound glass epoxy.

8. An invention as in claim 2 wherein said high impact cylinder is formed of a phenolic plastic resin material.

9. An invention as in claim 1 wherein said electrically conductive members respectively connected to electrically couple the ends of the semi-conductive layer to said terminals each comprise, the combination of an elastomeric conductive sleeve mounted around one of said terminals in conducting relation therewith and extending outwardly therefrom in a direction concentric with a longitudinal axis of the terminal, and an annular metal spring embedded in the conductive sleeve to assure good electrical contact therewith, said spring being adapted to dilate and receive one end of the semi-conductive layer therein, whereby the spring forms a resilient electrical contact with said layer.

10. An invention as in claim 9 wherein the opposite ends of said semi-conductive layer are conically tapered outward from the relatively small-diameter portions thereof adjacent the respective areas contacted by said annular springs to a larger diameter portion thereof having said coating of conductive material thereon, the respective inner surfaces of said cup-shaped terminal housings being formed to complement said conical surfaces whereby a water-tight, voltage grading seal is formed by said surfaces when the housings are in their respective operating positions.

References Cited

UNITED STATES PATENTS

| | | | |
|---|---|---|---|
| 2,593,426 | 4/1952 | Fannoe | 337—224 |
| 2,660,644 | 11/1953 | Murry et al. | 337—224 |
| 2,700,085 | 1/1955 | Breisch et al. | 337—201 |
| 2,844,691 | 7/1958 | Howell | 337—224 |
| 3,512,118 | 5/1970 | Leonard | 337—201(UX) |
| 3,513,425 | 5/1970 | Arnot | 337—201 |

BERNARD A. GILHEANY, Primary Examiner

D. M. MORGAN, Assistant Examiner

U.S. Cl. X.R.

337—201